United States Patent [19]

Wilson et al.

[11] Patent Number: 4,502,956
[45] Date of Patent: Mar. 5, 1985

[54] FILTER ASSEMBLY

[75] Inventors: Michael E. Wilson, Modesto; David R. Olson, Turlock; Walter H. Stone; Robin B. MacDonald, both of Modesto, all of Calif.

[73] Assignee: Racor Industries, Inc., Modesto, Calif.

[21] Appl. No.: 568,271

[22] Filed: Jan. 3, 1984

Related U.S. Application Data

[63] Continuation of Ser. No. 351,761, Feb. 24, 1982, abandoned.

[51] Int. Cl.$^3$ .............................................. B01D 27/08
[52] U.S. Cl. .................................... 210/248; 210/303; 210/312; 210/315
[58] Field of Search .................... 210/744, 97, 99, 111, 210/114, 123, 185, 232, 238, 242, 300, 301, 303, 311, 315, 307, 308, 312, DIG. 5

[56] References Cited

U.S. PATENT DOCUMENTS

| | | | |
|---|---|---|---|
| 1,002,792 | 9/1911 | Weitzenhoffer | 210/232 |
| 1,616,577 | 2/1927 | Janette | 210/248 |
| 2,326,691 | 8/1943 | Schum | 210/311 |
| 2,494,884 | 1/1950 | Lassmann et al. | 210/416.4 |
| 2,524,336 | 10/1950 | Dokes | 210/303 X |
| 2,651,414 | 9/1953 | Lawson | 210/DIG. 5 |
| 3,199,676 | 8/1965 | May | 210/DIG. 5 |
| 3,228,527 | 1/1966 | McAnerson | 210/DIG. 5 |
| 3,280,981 | 10/1966 | Renfrew | 210/303 |
| 3,508,658 | 4/1970 | McVay | 210/114 |
| 4,231,768 | 11/1980 | Seibeat | 210/DIG. 5 |

FOREIGN PATENT DOCUMENTS 2078536 1/1982 United Kingdom ......... 210/DIG. 5

Primary Examiner—John Adee
Attorney, Agent, or Firm—Kerkam, Stowell, Kondracki & Clarke

[57] ABSTRACT

A fuel filter assembly in which a filter cartridge, threadedly supported from a mounting unit, engages and supports a contaminant collection bowl having a plurality of collection zones respectively upstream and downstream of fuel treatment means within the cartridge. In general, a dual media filter element includes a flow passage axially thereof with means at one end for carrying the filter element from a support head, and means on the other for supporting a contaminant collection bowl beneath. A primer pump disposed axially of the filter element moves between advanced and retracted positions therealong.

29 Claims, 10 Drawing Figures

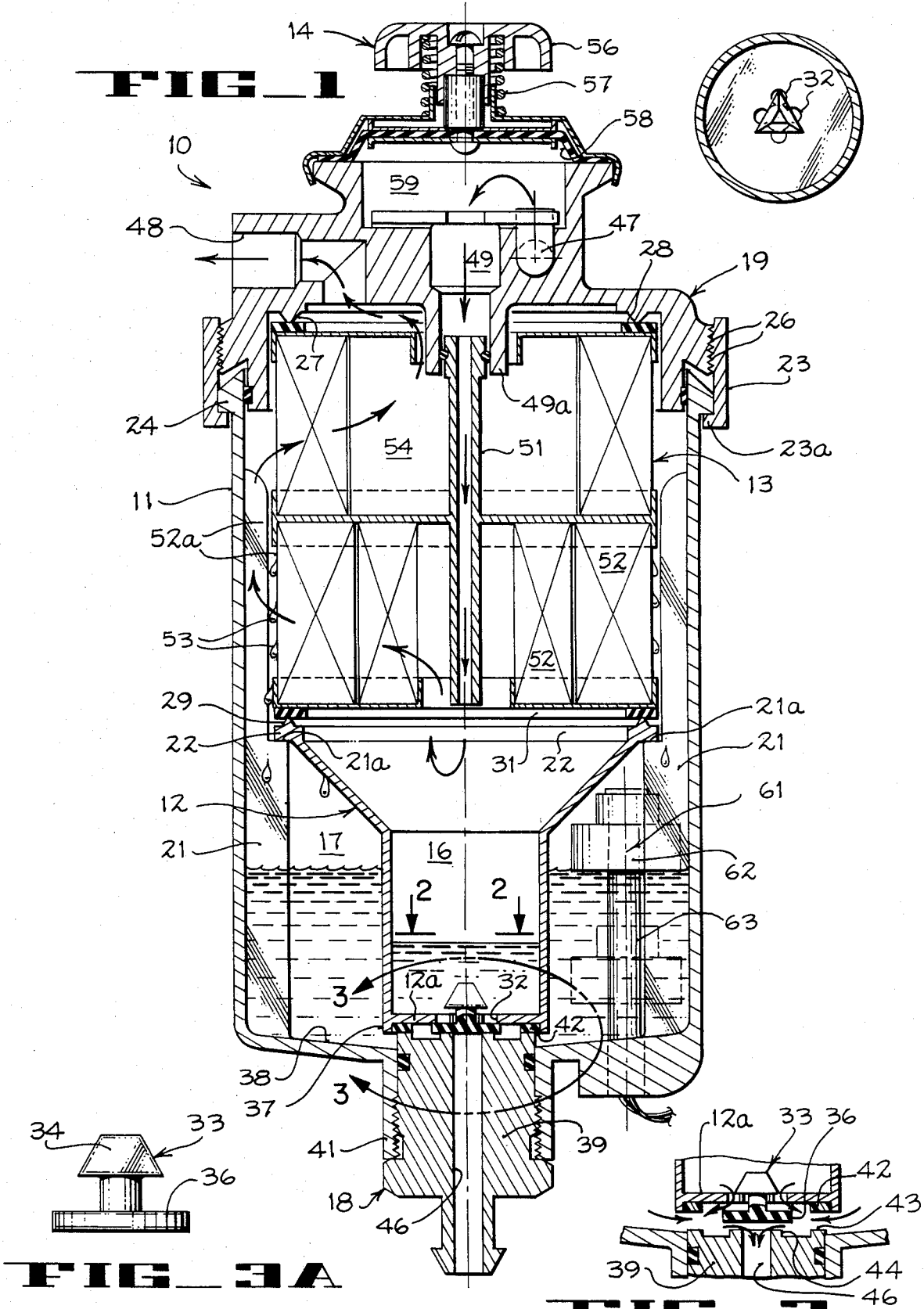

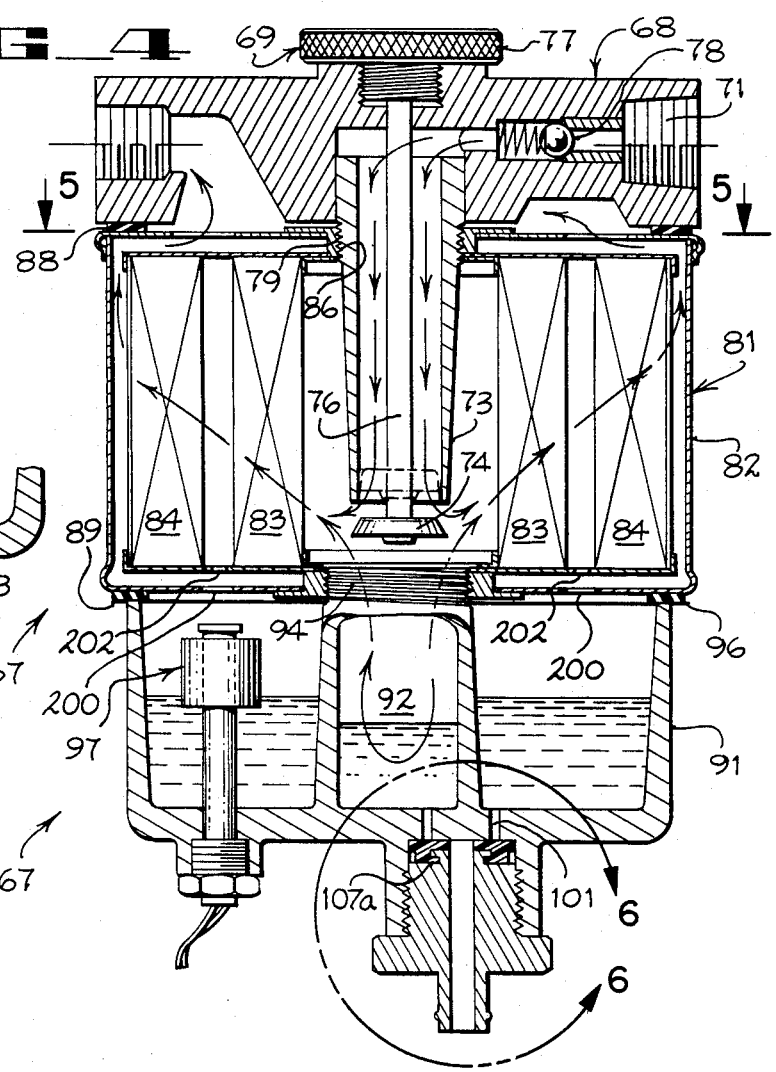
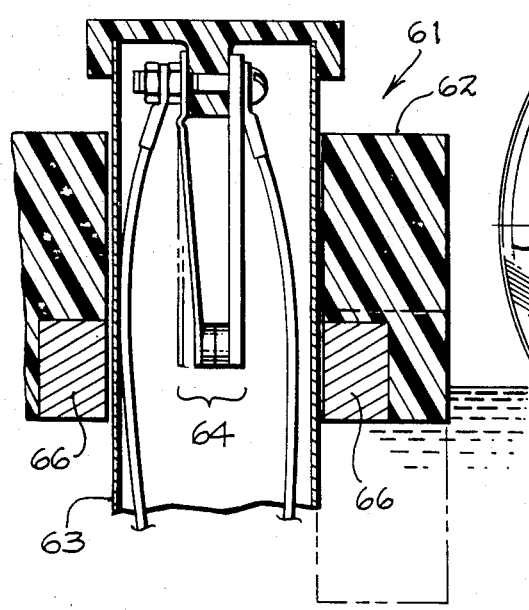
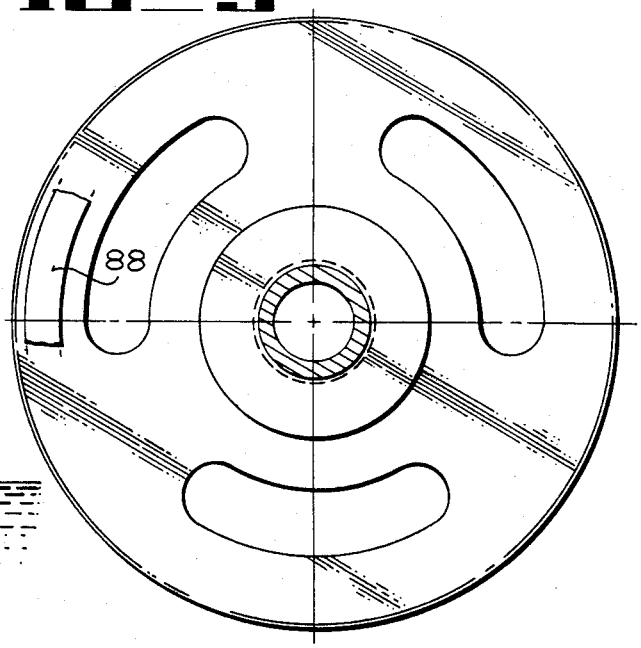

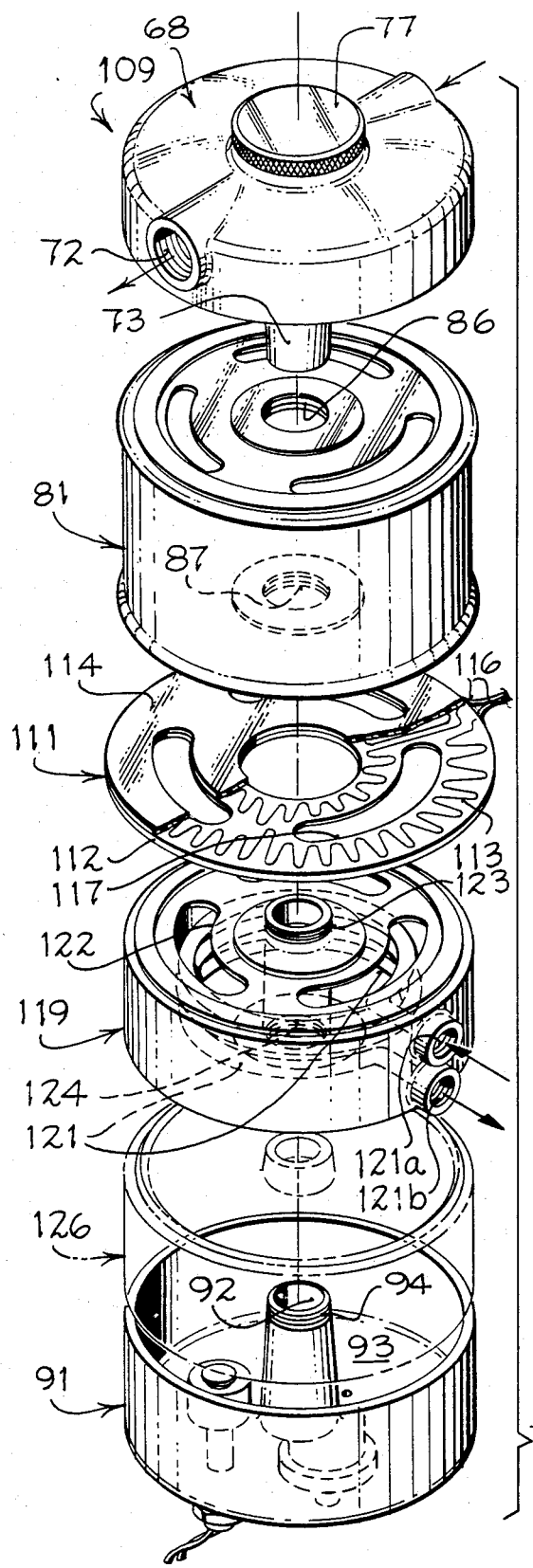
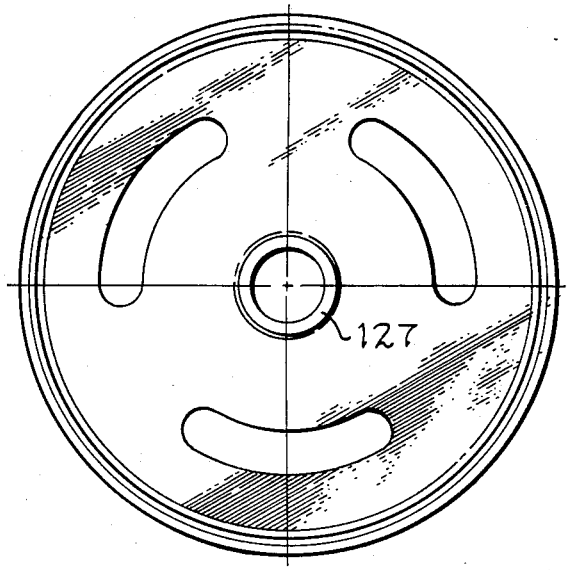
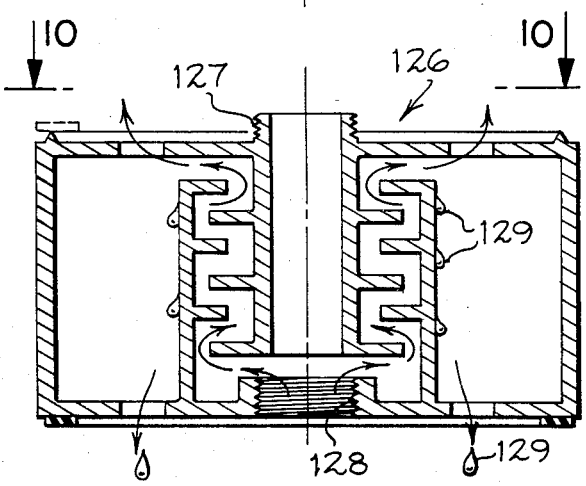

FILTER ASSEMBLY

This application is a continuation of application Ser. No. 351,761 filed Feb. 24, 1982, now abandoned.

This invention pertains to a filter assembly particularly useful in removing contaminants such as water and particulate matter from fuel as found in diesel fuels.

Numerous types, sizes and shapes of fuel filters have heretofore been provided, each of which includes one or more undesirable aspects.

One particularly troublesome aspect in the use of fuel filters in the operating of diesel equipment is found in the fact that under cold weather conditions various problems can exist such as difficulty in starting due to the low temperature of the fuel involved; freezing of a contaminant collection bowl, or the like, etc.

Accordingly, there has been a need for an improved fuel filter assembly.

In general there has been provided a filter assembly of a type adapted to separate water and other contaminants from liquid fuels. Supporting means including flow passages for supplying fluid fuel into and out of the assembly carries a container including filter means therein. Means forming a first and second collection zone for collecting contaminants therein has been coupled in fluid communication with the filter means to dispose the first and second collection zones respectively upstream and downstream of at least a portion of the filter means. In addition, means common to both said collection zones serves to simultaneously drain contaminants from each.

It is a general object of the present invention to provide an improved filter assembly.

It is another object of the invention to provide such a filter assembly arranged in a manner to extend the life of the filter unit.

A further object of the invention is to provide a filter assembly arranged in a manner to improve the efficiency of a water coalescing and/or separation media.

Yet an additional object of the invention is to provide an improved filter assembly of a type employing a sequence of functional units coupled in tandem to define a flow path via each unit.

A further object of the invention is to provide an improved dual media filter unit for use in a filter assembly of a type employing a sequence of functional units coupled in tandem as noted above.

Yet another object of the invention is to provide improved fuel heater units adapted to be captured or coupled between adjacent functional units.

Another object of the invention is to provide a filter assembly characterized by first and second collection zones disposed respectively upstream and downstream of a fuel treatment unit and defining a flow path radially outwardly of a portion of that unit.

The foregoing and other objects of the invention will become more readily evident from the following detailed description of preferred embodiments when considered in conjunction with the drawings, in which:

FIG. 1 shows a diagrammatic elevation section view of a filter assembly and contaminant discharge system according to the invention;

FIG. 2 shows a plan view taken along the line 2—2 of FIG. 1;

FIG. 3 shows an enlarged detail view in a region bounded by the line 3—3 of FIG. 1;

FIG. 4 shows a diagrammatic elevation section view according to another embodiment of the invention;

FIG. 5 shows a plan view taken along the line 5—5 of FIG. 4;

FIG. 6 shows an enlarged detail view of a portion of the structure bounded by the line 6—6 of FIG. 4;

FIG. 7 shows an enlarged detail section view of a magnetic float switch;

FIG. 8 shows an exploded view of a fuel filter assembly according to the embodiment shown in FIG. 4 but including additional functional components contained therein;

FIG. 9 shows a diagrammatic elevation section view of a fuel baffle assembly as diagrammatically represented in FIG. 8; and FIG. 10 shows a plan view of FIG. 9.

The filter assembly 10 generally includes an elongate hollow outer body 11, means such as the funnel-shaped separator unit 12 disposed beneath a filter cartridge 13 so as to define a pair of contaminant collecting zones or chambers 16, 17. In addition, a primer pump assembly 14 serves initially to supply fuel into the system and through filter cartridge 13. A drain assembly 18 simultaneously drains both contaminant collection chambers 16, 17 which remain otherwise isolated from each other while a cap assembly 19 supports the entire arrangement and provides means for supplying fuel into and out of the filter assembly 10.

Means supporting separator unit 12 axially within outer body 11 includes a plurality of elongate braces or stringers 21 distributed around the interior of body 11. Each stringer 21 includes a notched shoulder 12a for receiving the underside of the top rim 22 of separator unit 12. Stringers 21 extend further upwardly in closely spaced guiding relation to the side wall of cartridge assembly 13.

Cartridge assembly 13 becomes clamped tightly into position by the action of locking ring 23. Thus, ring 23 includes a radially inwardly directed lower lip 23a disposed to engage the underside of a shoulder 24 extending radially outwardly from the upper end of body 11. The upper inner edge margin of ring 23 includes threads adapted to engage corresponding external threads 26 of cap assembly 19.

Accordingly, by rotating ring 23 cap assembly 19 will be drawn downwardly toward cartridge 13 whereby a depending annular rib within cap assembly 19 and 27 of triangular cross-section will press against an upper annular resilient seal 28 carried atop cartridge 13. The compression of rib 29 urges cartridge 13 downwardly against the annular sealing rib 29 of triangular cross-section as carried to protrude upwardly from rim 22. Accordingly, an annular resilient gasket 31 carried on the bottom surface of cartridge 13 engages rib 29 to form a seal therebetween surrounding the bottom periphery of cartridge 13.

For purposes that will be explained further below separator unit 12 includes a cylindrical contaminant collection chamber 16 and, after the seal has been made by means of rib 29 and gasket 31 a second collection chamber 17 is defined isolated from the first.

Means for simultaneously draining both collection chambers 16, 17 includes assembly 18 shown best in FIGS. 2 and 3.

Thus, the bottom of collection chamber 16 includes a plurality of drain openings 32 for discharging contaminants from chamber 16. Drain valve assembly 18, characterized by a valve element 33 of resilient material such as rubber, includes a retaining cap 34 adapted to be passed through and disposed above the surface of the bottom 12a of chamber 16. As shown in FIG. 2 the lateral scope of cap 34 remains insufficient to cover all drain openings 32 so as not to block the flow of contaminants out of chamber 16.

Valve element 33 moves between raised and lowered positions with respect to the bottom surface 12a of chamber 16 to permit a closure portion 36 to be moved into and out of blocking relation to drain openings 32 as described further below.

The lower outer edge 37 of unit 12 lies in spaced relation to the floor 38 of chamber 17 so as to form a flow passage therebetween by withdrawing the valve operating element 39. Valve operating element 39 includes threads for engaging the internal threads within the downwardly directed sleeve 41 so as to retract and advance element 39 with respect to valve element 33.

Means forming a seal with respect to the drainage of liquid from chamber 17 comprises an annular gasket 42 carried about the periphery of the underside of the bottom 12a. In addition, the upper end of operating element 39 has been formed to include an annular peripheral rib 43 for engaging gasket 42 when element 39 has been moved to its projected or raised position.

Simultaneously, it will be noted than an annular rib 44 formed about the entrance to a drain channel 46 cooperates with the underside of closure portion 36 to force valve element 33 into a closure position with respect to drain openings 32.

Cap assembly 19 provides inlet and outlet ports 47, 48, respectively, and means forming an inlet port extension 49 terminating in a cylindrical sleeve portion 49a for entry into sealed relation with the upper end of fuel delivery tube 51 mounted axially within cartridge 13. Cartridge 13 includes fixed dual media as follows: The lower media 52 includes a suitable material such as fiber glass and foam for coalescing and releasing water droplets 53 at its exterior periphery to drain downwardly into chamber 17.

The upper stage of cartridge 13 includes a filter media 54 whereby fuel discharging from the exterior of media 52 can pass longitudinally upwardly along the interior of body 11 and enter into media 54 to be filtered and ultimately discharged via outlet port 48.

In operation, primer pump assembly 14 is first operated to initially supply fuel to an engine. Depressing the knob 56 against the force of spring 57 causes the flexible diaphragm 58 to be moved into and out of the loading chamber 59. As diaphragm 58 is released to move upwardly fuel is drawn into chamber 59 via inlet port 47. Subsequently as diaphragm 58 moves downwardly the fuel is charged downwardly via delivery tube 51 to be discharged into the region of the first collection chamber 16. The flow of must reverses its direction in chamber 16 and thereby slows substantially. As the fuel slows particulate debris, free water, or other matter entrained in the fuel is permitted to drop out and be received within contaminate collection chamber 16.

Subsequently, the flow of fuel continues from a location radially inwardly of media 52 so as to pass radially outwardly therethrough. Thus, as the fuel reaches the surface of a release layer 52a, coalesced droplets 53 collect and drain downwardly along the side wall thereof as noted.

The emerging fuel subsequently flows upwardly and through filter media 54 to be discharged via outlet port 48.

Finally, with respect to the embodiment shown in FIG. 1 a magnetic float switch assembly 61 (FIG. 7) comprises an annular float 62 of a suitable known material which will float in water and sink in diesel fuel. Float 62 moves between advanced and retracted positions along the switch housing 63 containing a switch 64 activated by the presence of an annular magnet 66 carried within float 62.

When water in chamber 17 reaches a given level, magnet 66 in float 62 serves to activate switch 64 within housing 63 so as to alert the operator that chamber 17 needs to be drained. Draining both chambers 16, 17 simultaneously simply requires the unscrewing of valve operating element 39 to establish the flow passage between gasket 42 and rib 43 while also releasing the force behind valve element 33 to permit it to fall and thereby open drain openings 32.

By dropping operating element 39 sufficiently below valve element 33, the element 33 will become suspended by means of retaining cap 34. Thus, closure portion 36 will no longer block drain channel 46 whereby drainage will now flow from both chambers 16, 17 into channel 46.

As fuel flows downwardly through cartridge 13, chamber 16 collects not only solids, but also water entrained in the fuel which is sufficiently free that it need not be coalesced to be separated from the fuel. It has been observed that by first eliminating this free water as well as the particulate matter which can be collected as noted above in chamber 16, the life of filter media 54 can be significantly extended as well as that of filter media 52. Further, the filtering system as arranged herein directs the fuel through both media 52, 54 in that direction believed most efficient for each.

From the foregoing, the general arrangement of Applicants' invention can be readily understood. According to an additional preferred embodiment as shown in FIGS. 4–10 certain improvements have been provided as now to be described.

The embodiment shown in FIG. 4 provides the basic structure upon which a modular stack of functional units can be selectively associated. Thus, in general, filter assembly 67 includes a cap assembly 68 characterized by a primer pump 69 and flow passages forming inlet and outlets 71, 72, l respectively to permit the flow of fuel into and out of assembly 67. An elongate rigid tube 73 suitably fastened into cap assembly 68 forms a continuation of the inlet flow passage 71. A pliant plunger element 74 carried on the distal end of a plunger rod 76 moves readily upwardly into tube 73. Knob 77 threadedly held to the top of cap assembly 68 may be used to operate plunger element 74 between raised and lowered positions. In operation as element 74 moves upwardly fuel readily passes across its pliant edge. A single check valve 78 blocks the discharge of fuel back through inlet 71. However, during the downward stroke of element 74 fuel located ahead of it in tube 73 will be discharged and additional fuel drawn by suction through valve 78. In this manner an initial loading of fuel can be primed to an engine operating on the fuel involved.

Means, such as threads 79, formed about the periphery of tube 73 at its upper end serve to mount a sequence of functional units in tandem, for example, including the dual media filter assembly 81. Assembly 81 which may also be referred to as a filter cartridge or a spin-on filter, includes a container 82 for holding a plurality of filter media such as the elongate annular coalescing filter media 83 disposed concentrically within an elongate annular filter 84. The opposite ends of container 82 includes threaded openings 86, 87, respectively, for supporting filter assembly 81 and other functional units in tandem with respect to cap assembly 68.

As thus arranged the threaded opening 86 engages threads 79 of tube 73 whereby filter assembly 81 can be essentially "screwed" onto and upwardly against the underside of cap assembly 68 until a reliable seal is formed by means of the gasket 88 carried atop container 82. The opposite end of container 82 carries a similar annular gasket 89 whereby a contaminant collecting bowl 91 may be attached beneath filter assembly 81 as now to be described.

Bowl 91 includes a central hollow contaminant collecting chamber or pre-filter 92 disposed upstream of filter media 83, 84. A second collecting chamber 93 surrounds chamber 92 to form a collection zone downstream of at least media 83. Threads 94 formed about the upper end of the elongate cylindrical wall forming chamber 92 serve to engage threads 87 to support bowl 91 therefrom. Means forming a seal with respect to filter assembly 81 includes gasket 89 cooperating with the upper edge 96 of the outer periphery of bowl 91. In addition to the above a float switch assembly 97 corresponding to float switch assembly 61 has been mounted in the outer collection chamber 93.

Means for draining both collection chambers 92, 93 simultaneously includes the drain valve assembly 98 simultaneously controlling drainage via drain ports 99, 101, (associated respectively with the inner and outer contaminant collection chambers 92, 93). Assembly 98 includes a valve operating element 102 formed with a drain channel 103 axially thereof and external threads 104 for engaging threads of the downwardly depending sleeve 106. Means for retaining a compliant seal element 107 includes a flanged button 108 formed about drain channel 103 at the upper end of element 102.

Seal element 107 includes a downwardly and radially inwardly extending lip 107a adapted to wrap about button 108.

As thus arranged, as valve operating element 102 is unscrewed downwardly along sleeve 106 both drain ports 99, 101 open to provide drainage via channel 103. Similarly, by driving element 102 upwardly against drain ports 99, 101 they become sealed. While ports 99, 101 have been referred to as single ports it will be readily evident that additional numbers of ports can be provided or the size of these ports can be enlarged to provide appropriate drainage under the circumstances.

As shown in FIG. 8 a fuel filter assembly 109 includes a sequence of functional units coupled in tandem to each other for treatment of fuel passing therethrough and collecting contaminants therefrom in a contaminant collecting bowl 91.

One of the functional units of filter assembly 109 includes a fuel pre-heater 111 including a layer 112 of electrically insulating material. An electric heater coil 113 of conductive material carried by layer 112 may be applied using printed circuit board techniques, for example. Means for electrically insulating coil 113 includes an overlayer 114 of electrically insulating material applied onto layer 112 so as to capture coil 113 therebetween. Electric leads 116 lead out from coil 113 and are coupled thereto to be adapted to be connected to a source of electricity for heating the coil. The periphery of unit 111 extends sufficiently beyond the confronting edges of a pair of functional units of assembly 109 so as to be engaged and sealed therebetween.

Pre-heater 111 includes a plurality of fluid passages 117 formed therethrough. Thus, when a unit of the kind described is employed as the operator turns on the ignition key, power is coupled to the pre-heater and fuel that is primed to the engine will be warmed to some limited extent by pre-heater 111.

During normal operations, however, a fuel system may encounter cold weather and in order to provide substantial heating of the fuel as well as prevention of freezing of the various units, an operational heater unit 119 may be coupled to the bottom of filter assembly 81 whereby hot water from the cooling system of the engine can be applied to a coil 121 via inlet 121a and discharged via outlet 121b. The interior of unit 119 remains otherwise generally open so as to permit fuel to circulate freely therethrough and to pass upwardly via the kidney shaped flow passages 122 formed in both top and bottom of unit 119.

Means for coupling unit 119 into assembly 109 includes the upwardly protruding threaded sleeve 123 carried by the upper surface of unit 119 and the threaded opening 124 formed in the bottom of unit 119.

Means for varying the flow path of fuel passing through assembly 109 may, for example, include a baffle unit 126. Baffle unit 126 is best shown in FIG. 9 and includes means for securing same between a pair of units contained in assembly 109 by means of the upwardly extending male threads 127 in the top cover and the female threads 128 in the bottom cover. Both the top and bottom of baffle unit 126 include kidney shaped openings as shown in FIG. 10 forming flow passages for discharging fuel upwardly through assembly 109.

The surfaces within baffle unit 126 serve to collect droplets 129 of water entrained in the fuel passing through the system. Accordingly, the droplets of water 129, having a greater density than that of the diesel fuel in which it is found serve to drain into bowl 91.

From the foregoing it will be readily evident that there has been provided a sequence of functional units for a filter assembly whereby the various units can be captured between adjacent pairs of other units.

In addition, it will be further evident that the orientation of filter media such as the water coalescing and separation filter 83 and the pleated filter unit 84 have been disposed in a more efficient orientation whereby the flow path of fuel passes radially outwardly therethrough. In this way the flow of fuel slows as it reaches the radially outer release layer on the periphery of media 83 so as to permit water coalesced to collect and drop downwardly through the 200 openings formed in the bottom of container 82.

Subsequently, the fuel passing into filter 84 will therefore be relieved of particulate matter by virtue of the pre-filter action in chamber 92 and also relieved of a substantial portion of the water entrained therein by virtue of its passage through media 83, the substantial portion of water having passed out through holes 202 and 200. Accordingly, filter 84 will be called upon substantially only to act as a water and fine particle barrier for the fuel as it passes toward outlet 72.

The holes 200 may each be considered as a second contaminant outlet, the first contaminant outlet being the hole within threads 94. Since each of the second contaminant outlets is outside of the threads 94, the first and second contaminant outlets are radially spaced.

In this way it has been observed that the life of the filter media can be substantially extended.

What is claimed is:

1. A filter assembly adapted to remove contaminants from liquid fuel comprising:
   (a) a body;
   (b) a first filter media and a second filter media disposed within said body;
   (c) a contaminant collection bowl means supported by said body and defining first and second collection zones, each collection zone disposed to collect liquid contaminants as fuel passes through the assembly, said first collection zone is upstream of both said first and second filter media and said second collection zone is downstream of said first filter media and upstream of said second filter media; and
   (d) means common to both said first and second collection zones for simultaneously draining contaminants from said first and second collection zones, and
   wherein, in operation, said first and second collection zones are completely walled off from each other with the only communication between said first and second collection zones being through said body by way of a first contaminant outlet and at least one second contaminant outlet.

2. The filter assembly of claim 1 wherein said collection bowl means is releasably engaged to a first side of said body, said first side of said body including said first and second contaminant outlets allowing liquid contaminants to pass out of said body respectively into said first and second collection zones, said first side of said body opposite a second side of said body, and said second side of said body includes a fuel inlet port and a fuel outlet port.

3. The filter assembly of claim 2 wherein said collection bowl means includes threads engaged to mating threads of said body.

4. The filter assembly of claim 3 wherein said threads of said collection bowl means and said mating threads of said body are centrally located, said first contaminant outlet is within said mating threads of said body, and said second contaminant outlet is outside of said mating threads of said body.

5. The filter assembly of claim 4 wherein said body and said collection bowl means are both cylindrical and said first collection zone is centrally located within said collection bowl means.

6. The filter assembly of claim 5 wherein said first and second collection zones which are completely walled off from each other with the only communication between said first and second collection zones being through said body by way of said first and second contaminant outlets; farther including said body being part of a filter cartridge.

7. The filter assembly of claim 1 wherein said bowl collection means is completely supported by, and releasably engated to, said body and, said body is part of a filter cartridge.

8. A filter assembly adapted to remove contaminants from liquid fuel comprising:
   (a) a filter cartridge having a body and filter media disposed therein, said body having a fuel input port and a fuel outlet port and first and second contaminant outlets, said first and second contaminant outlets disposed on a first side of said body;
   (b) a contaminant collection bowl supported by said body and releasably engaged to said first side of said body, said collection bowl having separate first and second collection zones, said first collection zone disposed to collect liquid contaminants from said first contaminant outlet as fuel passes through the assembly, said second collection zone disposed to collect liquid contaminants from said second contaminant outlet as fuel passes through the assembly; and
   (c) means common to both said first and second collection zones for simultaneously draining contaminants from said first and second collection zones.

9. The filter assembly of claim 8 wherein said first side of said body is opposite from a second side of said body and said fuel inlet and fuel outlet ports are disposed on said second side.

10. The filter assembly of claim 9 wherein said collection bowl includes threads engaged to mating threads on said first side of said body.

11. The filter assembly of claim 10 wherein said second side of said body includes threads engaged to threads on a cap assembly, said cap assembly including a fuel inlet conduit and a fuel outlet conduit respectively disposed in communication with said fuel inlet port of said body and said fuel outlet port of said body, and said collection bowl is completely supported by said filter cartridge.

12. The filter assembly of claim 11 wherein said body and said collection bowl are both cylindrical and said first collection zone is centrally located within said collection bowl.

13. The filter assembly of claim 10 wherein said threads of said collection bowl and said mating threads of said body are centrally located, said first contaminant outlet is within said mating threads of said body, and said second contaminant outlet is outside of said mating threads of said body.

14. A filter assembly adapted to remove contaminants from liquid fuel comprising:
   (a) a filter cartridge having a body and filter media disposed therein, said body having a fuel inlet port and a fuel outlet port and first and second contaminant outlets, said first and second contaminant outlets disposed on a first side of said body;
   (b) a contaminant collection bowl supported by said body and releasably engaged to said first side of said body, said collection bowl having separate first and second collection zones, said first collection zone disposed to collect liquid contaminants from said first contaminant outlet as fuel passes through the assembly, said second collection zone disposed to collect liquid contaminants from said second contaminant outlet as fuel passes through the assembly;
   (c) first and second drain ports for respectively draining said first and second collection zones; and
   wherein, in operation, said first and second collection zones are completely walled off from each other with the only communication between said first and second collection zones being through said body by way of said first and second contaminant outlets, and wherein said first contaminant outlet is upstream of all of said filter media and said second contaminant outlet is downstream of at least a portion of said filter media.

15. The filter assembly of claim 14 wherein said fuel inlet port and said first contaminant outlet are each centrally located within threads on opposite sides of said body.

16. A filter assembly adapted to remove contaminants from liquid fuel comprising:
   (a) a filter cartridge having a body and filter media disposed therein, said body having a fuel inlet port and a fuel outlet port and first and second contaminant outlets, said first and second contaminant outlets disposed on a first side of said body;
   (b) a contaminant collection bowl supported by said body and releasably engaged to said first side of said body, said collection bowl having separate first and second collection zones, said first collection zone disposed to collect liquid contaminants from said first contaminant outlet as fuel passes through the assembly, said second collection zone disposed to collect liquid contaminants from said second contaminant outlet as fuel passes through the assembly;
   (c) first and second drain ports for respectively draining said first and second collection zones; and
   wherein, in operation, said first and second collection zones are completely walled off from each other with the only communication between said first and second collection zones being through said body by way of said first and second contaminant outlets, wherein said first contaminant outlet is upstream of all of said filter media and said second contaminant outlet is upstream of at least a portion of said filter media.

17. The filter assembly of claim 14 wherein said collection bowl includes threads engaged to mating threads on said first side of said body.

18. The filter assembly of claim 17 wherein said first side of said body is opposite from a second side of said body and said fuel inlet and fuel outlet ports are disposed on said second side.

19. The filter assembly of claim 18 wherein said second side of said body includes threads engaged to threads on a cap assembly, said cap assembly including a fuel inlet conduit and a fuel outlet conduit respectively disposed in communication with said fuel inlet port of said body and said fuel outlet port of said body, and said collection bowl is completely supported by said filter cartridge.

20. The filter assembly of claim 17 wherein said body and said collection bowl are both cylindrical and said first collection zone is centrally located within said collection bowl, and wherein said threads of said collection bowl and said mating threads of said body are centrally located, said first contaminant outlet is within said mating threads of said body, and said second contaminant outlet is outside of said mating threads of said body.

21. An invention comprising a filter bowl unit adapted to be removably attached underneath a filter cartridge which uses radially outward flow through an annular filter media to separate contaminants from fuel, said bowl unit comprising:
   (a) a centrally located first contaminant collection zone for receiving contaminants from a first contaminant outlet in the filter cartridge;
   (b) second contaminant collection zone for receiving contaminants from a second contaminant outlet in the filter cartridge and disposed around said first contaminant zone;
   (c) a wall separating said first and second contaminant collection zones and, in operation, the bowl unit allowing communication between said first and second contaminant collection zones only by way of the first and second contaminant outlets;
   (d) threads on said bowl unit and operable to connect said bowl unit to mating threads on the filter cartridge, and
   (e) means common to both said first and second contaminant collection zones for simultaneously draining contaminants from said first and second contaminant collection zone.

22. The invention of claim 21 wherein said threads on said bowl unit are disposed on said wall.

23. The invention of claim 22 wherein said second contaminant collection zone is annular.

24. The invention of claim 23 wherein said bowl unit is cylindrical and said wall is cylindrical.

25. The invention of claim 21 wherein said bowl unit is threadably attached to a filter cartridge having a body and filter media disposed therein, said body having a fuel inlet port and a fuel output port and first and second contaminant outlets.

26. A filter cartridge adapted to remove contaminants from liquid fuel comprising:
   (a) a cylindrical body;
   (b) an annular first filter media disposed within said body;
   (c) radially spaced first and second contaminant outlets disposed on a first side of said body, said first contaminant outlet is upstream of all of said filter media and said second contaminant outlet is upstream of at least a portion of said filter media;
   (d) a fuel inlet port and a fuel outlet port disposed on a second side of said body, said second side opposite said first side; and
   (e) threads on said first side for removably attaching a collection bowl unit to said body to receive contaminants passed out through said first and second contaminant outlets, and
   wherein said threads are centrally located on said first side and said first contaminant outlet is within said threads and said second contaminant outlet is outside of said threads.

27. The filter cartridge of claim 26 wherein said first contaminant outlet and said fuel inlet port are centrally disposed respectively on said first and second sides.

28. The filter cartridge of claim 27 further comprising threads on said second side and said fuel inlet port is within said second side threads and said fuel outlet port is outside of said second side threads, said second side threads operable to removably attach said filter cartridge to a cap assembly.

29. The filter cartridge of claim 26 further comprising an annular second filter media concentric with, and outside of, said first annular filter media; and wherein said first contaminant outlet is upstream of both said first and second filter media and said second contaminant outlet is downstream of said first filter media and upstream of said second filter media.

* * * * *

UNITED STATES PATENT AND TRADEMARK OFFICE
CERTIFICATE OF CORRECTION

PATENT NO. : 4,502,956

DATED : March 5, 1985

INVENTOR(S) : Wilson et al.

It is certified that error appears in the above-identified patent and that said Letters Patent is hereby corrected as shown below:

Claim 6, column 7 at line 56, change "farther" to --further--.

Claim 7, column 7 at line 60, change "engated" to --engaged--.

Signed and Sealed this

Eighteenth Day of June 1985

[SEAL]

Attest:

DONALD J. QUIGG

Attesting Officer

Acting Commissioner of Patents and Trademarks